United States Patent [19]

Hollander

[11] 3,998,364

[45] Dec. 21, 1976

[54] DISPENSING VALVE FOR BOTTLED CARBONATED BEVERAGES

[76] Inventor: Bruce Lee Hollander, 1240 NE. 207 Terrace, Miami, Fla. 33179

[22] Filed: Apr. 15, 1974

[21] Appl. No.: 460,803

[52] U.S. Cl. .............................. 222/511; 222/394; 222/464; 222/545; 251/7

[51] Int. Cl.² .................... B67D 1/04; F16L 55/14; B65D 83/14

[58] Field of Search .......... 222/394, 464, 545, 511, 222/541; 251/7, 9

[56] References Cited

UNITED STATES PATENTS

| | | | |
|---|---|---|---|
| 729,423 | 5/1903 | Schieber et al. | 251/9 X |
| 2,112,625 | 3/1938 | Jackson | 251/9 |
| 2,709,542 | 5/1955 | Eller et al. | 251/9 X |
| 3,134,505 | 5/1964 | Modderno | 222/394 X |

*Primary Examiner*—Stanley H. Tollberg
*Assistant Examiner*—Hadd S. Lane
*Attorney, Agent, or Firm*—Ernest H. Schmidt

[57] ABSTRACT

A dispensing valve for carbonated beverage bottles having means for connection of the valve body to the bottle neck in place of its closure cap, and comprising a flexible tube extending therethrough and arranged to pass down into the bottom of the bottle at one end and to extend to the outside of the valve body as a dispensing spout at its other end. Mechanism within the valve body normally squeezes a portion of the flexible tube passing therethrough into collapsed, cut-off or sealing condition, subject to push-button actuation operative to release the tube for manual controlled dispensing of the pressurized fluid through the spout. The bottle connection means includes resilient washer mechanism for sealing the tube with respect to the valve body, thereby preventing pressurized fluid or gas leakage between the tubing and the valve body.

8 Claims, 3 Drawing Figures

DISPENSING VALVE FOR BOTTLED CARBONATED BEVERAGES

This invention relates to beverage dispensing valves and is directed particularly to a novel and improved dispensing valve for use with bottled carbonated beverages to dispense the contents thereof under pressure as needed.

Various dispensing valve devices for discharging or dispensing carbonated or pressurized fluids or beverages from bottles or other containers have heretofore been devised. Such dispensing devices as are known, however, are deficient in various respects principally because of their complexity and because the dispensed fluid, in passing through the dispensing valve mechanism left traces which stagnated and deteriorated or spoiled therein when the parts were not frequently cleansed or washed. It is, accordingly, the principal object of this invention to provide a novel and improved dispensing valve closure device of the above nature wherein the fluid dispensed does not come into contact with the valve actuating mechanism, thereby eliminating any possibility of contamination.

A more particular object of the invention is to provide a dispensing valve device wherein the fluid withdrawal conduit extending down into the bottom portion of the carbonated beverage bottle upon use of the device, and the discharge spout, comprise an integral, continuous flexible tube, and wherein the control valve mechanism comprises clamp means for squeezingly cutting off flow through the tube where it passes through the valve body.

Yet another object of the invention is to provide a dispensing valve of the above nature wherein the flexible tube comprising the discharge spout can readily be removed from the valve body for replacement or cleaning.

Still another object is to provide a dispensing valve of the character described the major parts of which can be inexpensively produced of synthetic plastic materials by the use of mass production techniques such as injection molding and extrusion.

Still another object of the invention is to provide a dispensing valve for use with screw cap bottled carbonated beverages the valve body of which can be molded in the characterization of an animal's head or the like for enhanced sales appeal.

Yet another object of the invention is to provide a dispensing valve for bottled carbonated beverages which will be extremely simple in construction, inexpensive to manufacture, attractive in appearance and durable in use.

Other objects, features and advantages of the invention will be apparent from the following description when read with reference to the accompanying drawings; In the drawings, wherein like reference numerals denote corresponding parts throughout the several views.

Figure 1:
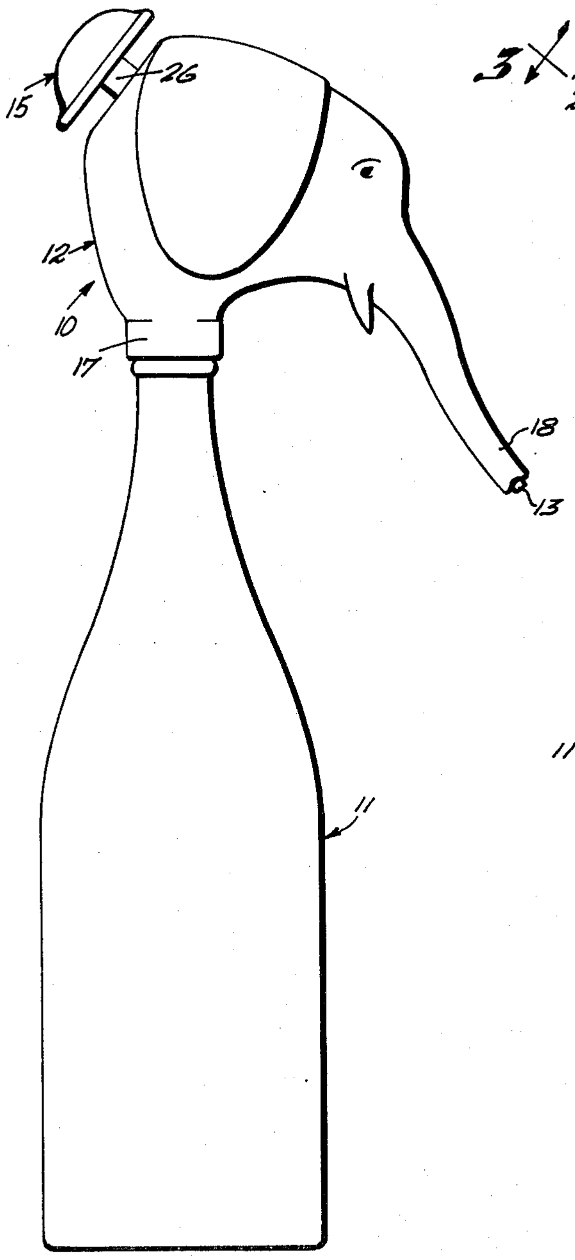
FIG. 1 is a side elevational view of a dispensing valve embodying the invention, shown assembled for use on a carbonated beverage bottle.

Referring now in detail to the drawings, reference numeral 10 designates, generally, a dispensing valve for bottled carbonated beverages, shown assembled for use to a glass bottle 11 for the dispensing of a carbonated beverage contained therein. The dispensing valve 10 comprises, generally, a body member 12, a flexible fluid discharge tube 13 extending through a round, arcuately-extending through passageway 14 formed in said body member, and a valve plunger mechanism 15 movable in a cylindrical opening or bore 16 transverse to the tube passageway 14 and operative to yieldingly collapse the discharge tube into sealing relation with respect to the forced flow of fluid therethrough.

The dispensing valve body member 10 will preferably be molded of a tough synthetic plastic material, and may take the form of a characterization of an animal's head, for example an elephant's head, as illustrated. Whatever the particular external shape or form of the body member 12, it is provided with a substantially cylindrical screw cap portion 17 and a spout portion 18 the longitudinal axis of which is preferably directed at an acute angle with respect to the axis of symmetry of said screw cap portion. The round through passageway 14 formed in the body member 12 is concentric at one end with respect to the screw cap portion 17, and at the other end with respect to the spout portion 18.

Means is provided for sealingly securing the dispensing valve 10 upon the externally-threaded neck 19 of an ordinary large-size carbonated beverage bottle 11. To this end, the screw cap portion 17 of the body member 12 is internally threaded, as indicated at 20. The inner end of the internally-threaded portion 20 extends into a short, concentric, cylindrical opening 21 of slightly increased diameter to define with the inner end of said thread a narrow, circumferential shoulder 22. Snugly fitted within the cylindrical opening 21, and retained in place by the peripheral shoulder 22, is a resilient washer 23, the wall of the central opening of which is of convex shape, as indicated at 24. The minimum diameter of the central opening in the washer 23, when said washer is in unstressed condition within its cylindrical opening 21 is substantially the same as the external diameter of discharge tube 13 so as to adjustably receive said tube for friction fit passage therethrough upon assembly of the device. When the screw cap portion 17 of the dispensing valve 10 is screwed down upon the neck 19 of a bottle 11, as illustrated in FIG. 1, the resilient washer 23, which will preferably be of natural or synthetic rubber, will become axially squeezed against the annular bottom 25 of the cylindrical opening 21 so as to distort principally inwardly in radical directions so as to circumjacently clamp about the fluid discharge tube 13 at its peripheral zone of through passage. Thus, it will be understood that not only is the upper end or mouth of the bottle neck 19 peripherally sealed with respect to the underside of the resilient washer 23, but the central washer opening will also seal against the flexible discharge tube 13 immediately behind its entrance for passage through the passageway 14 in the body member 12, thereby preventing any leakage of gas or fluid from the bottle into said passageway and the associated valve mechanism, or outwardly of the bottle through the open end of the valve body member screw cap portion 17.

Figure 2:
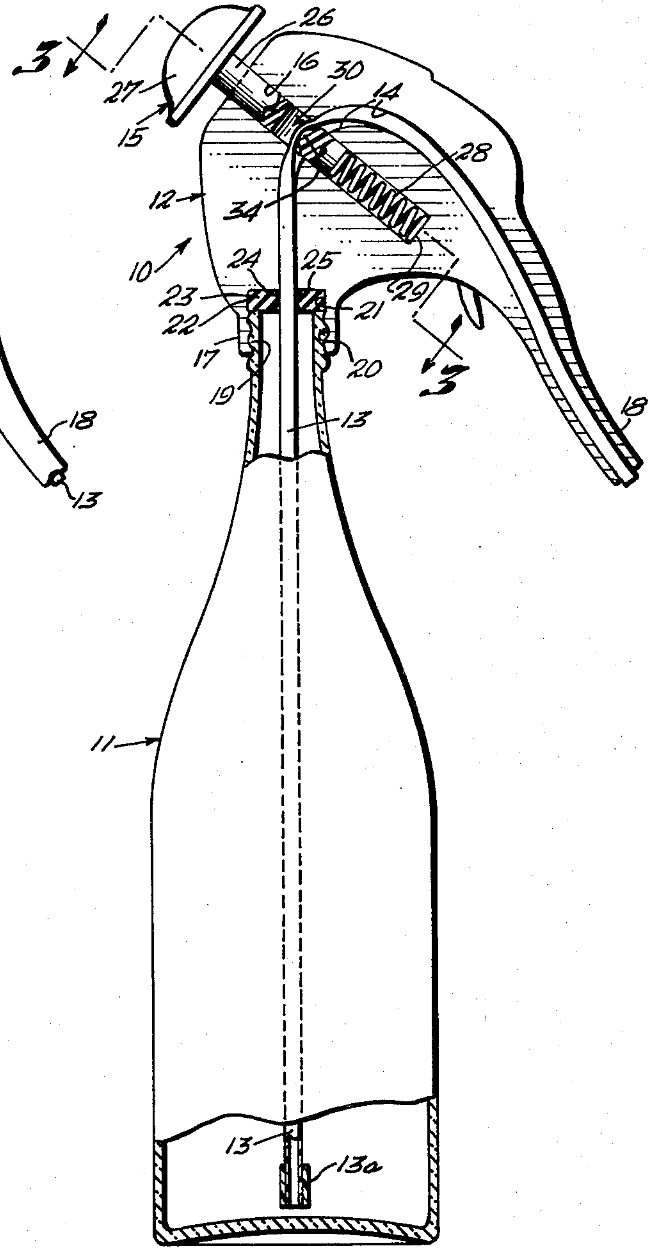
FIG. 2 is an elevational view of the dispensing valve and beverage bottle as in FIG. 1, partially in cross-section to illustrate mechanical details.

The valve plunger mechanism 15 comprises a cylindrical plunger rod portion 26 formed at one end with an actuating button portion 27 which, as illustrated in FIG. 1, is preferably in the form of a derby hat which, when assembled to the valve body member 12, simulates the wearing of a hat by the fanciful animal's head representation of the body member. The cylindrical plunger rod portion 26 is preferably integrally formed with the hat portion 27 of a tough, synthetic plastic material. The cylindrical plunger rod portion 26 is of such diameter as to slidingly fit within the cylindrical bore 16, and at its outer end, provides a seat for the abutment therewith of one end of a helical compression spring 28. As illustrated in FIG. 2, the cylindrical opening 16 extends somewhat short of the opposite side of the body member 12 to define a bottom wall 29 serving as a seat for the outer end of the helical compression spring 28.

Figure 3:
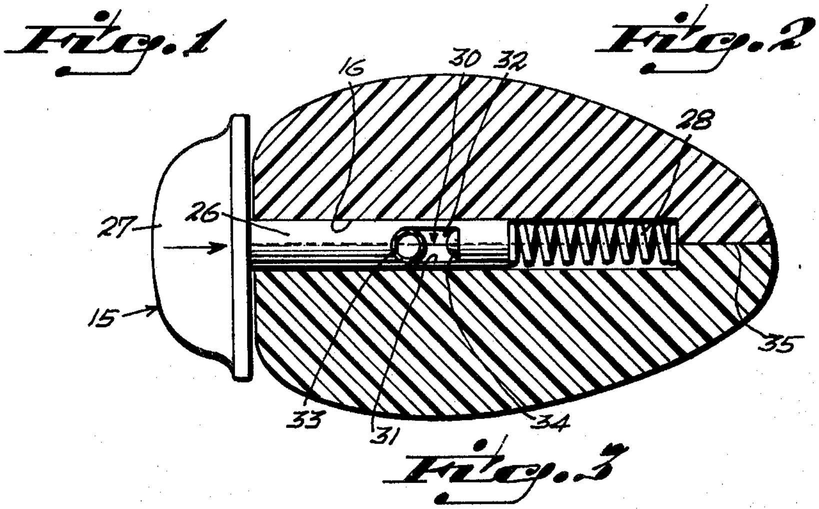
FIG. 3 is a transverse cross-sectional view of the dispensing valve, taken along the line 3-3 thereof in the direction of the arrows.

As best illustrated in FIGS. 2 and 3, the diameter of the plunger rod portion 26 of the valve plunger mechanism 15 is somewhat greater than that of the through passageway 14 in the body member 12, and is formed near the outer end thereof with a transverse through opening 30. The through opening 30 is symmetrical about the longitudinal axis of the plunger rod portion 26, and is defined by spaced, parallel side wall portions 31, 32 the inner ends of which merge into a concave, semi-cylindrical inner end wall portion 33 and the lower or outer ends of which extend into a convex, hemispherical wall portion 34.

The body member 12 of the dispensing valve 10 may conveniently be manufactured by injection molding in two complementary half-shell parts which will subsequently be cemented together along their plane of symmetry, as indicated by the parting line 35 thereof in FIG. 3. Finished assembly of the dispensing valve is thereafter simply accomplished by first press-fitting the washer 23 within the cylindrical opening 21, then inserting the valve plunger mechanism 15 into the cylindrical opening 16 to its fullest extent against the outward urging of the helical compression spring 28 to the limit position permitted by the button portion 27, and finally pushing one end of the flexible discharge tube 13 through the central opening 24 of the washer 23, the valve body passageway 14 and the through opening 30 of the plunger rod portion 26 to such an extent that it protrudes slightly from the spout portion 18. The opposite end of the tube 13 is long enough to reach the bottom of the beverage bottle with which the dispensing valve is to be used, so as to enable draining from the bottom of substantially all of the contained beverage, in quantities required from time-to-time by actuation of the valve mechanism. As illustrated in FIG. 2, the inner end of the tube 13 is preferably fitted with a slide-on re-enforcing sleeve **13*a*** to prevent collapse thereat.

It is to be noted that the through opening 30 in the plunger rod portion 26 is so located along the axial length thereof, that when the associated actuating button 27 is fully depressed for assembly as described above, the semi-cylindrical inner wall portion 33 of said through opening defines an arcuate upper wall portion (as seen in FIG. 3) substantially continuous with the shape of contiguous portions of the passageway 14, so as to smoothly guide the discharge tube 13 in its passage through the valve head assembly as described above. Upon release of the actuating button portion 27 after assembly of the dispensing tube 13, the compression spring 28 serves automatically to press the valve body plunger mechanism 15 outwardly so that the convex hemispherical wall portion 34 forming part of the through opening 30 collapses and jams the adjacent portion of the fluid discharge tube 13 into the opening defined by the juncture of the cuylindrical bore 16 with the passageway 14. The compressional force of the spring 21 and the resiliency of the fluid discharge tube 13 are such that said tube will be completely collapsed thereat with such force as to completely prevent the flow of fluid therethrough even under the maximum force of released carbon dioxide within the bottle. The valve plunger mechanism 15 thus serves normally to shut off flow through the discharge tube 13, allowing for discharge under pressure upon manually pressing the control button 27. In this connection, it will be noted that the discharge tube 13 will preferably be fabricated of somewhat resilient, tough synthetic plastic material, such as Nylon, having sufficient "memory" to automaticaly reassume its substantially round cross-sectional shape upon the depression of the button portion 27 for the dispensing of the contained carbonated beverage.

In use, the normal release of supercharged carbon dioxide from the contained carbonated beverage effects a gaseous pressure head within the bottom sufficient to discharge the fluid contents with adequate force for filling glasses, etc. If substantially greater dispensing force is required, such as when making mixed sodas or the like, this can readily be effected simply by shaking the carbonated beverage bottle to release greater volumes of the carbon dioxide and thereby increase the pressure head. It is further to be noted that the discharge tube 13 can readily be removed for replacement whenever desired.

While I have illustrated and described herein only one form in which my invention can conveniently be embodied in practice, it is to be understood that this embodiment is presented by way of example only and not in a limiting sense. The invention, in brief, comprises all the embodiments and modifications coming within the scope and spirit of the following claims.

What I claim as new and desire to secure by Letters Patent is:

1. A dispensing valve for bottled carbonated beverages comprising, in combination, a valve body member, a passageway of substantially circular cross-sectional shape extending through said body member and defining, with outer surface portions thereof, respective entrance and discharge openings, means for removably securing said body member to the neck of a beverage bottle, said securing means being circumjacent said entrance opening so that said passageway is in communication with the open mouth of the bottle to which said body member is secured, a length of flexible tubing extending through said passageway and projecting outwardly of said entrance opening and said discharge opening, valve mechanism carried by and moveable between first and second positions with respect to said body member, means resiliently retaining said valve mechanism in said first position whereat it is operative to squeezingly collapse a portion of said tubing within said body member for shutting off the flow of fluid therethrough, said valve mechanism including means operative upon manually moving said valve mechanism to said second position for releasing said tubing to permit the flow of fluid under pressure therethrough, said valve mechanism being located in a blind cylindrical opening in said body member the longitudinal axis of which extends transversely through said passageway, said valve mechanism comprising a valve plunger mechanism having a plunger portion slidably received within said cylindrical opening and extending outwardly of the open end thereof, a transverse opening in said valve plunger portion through which said length of tubing extends, said plunger opening having inner and outer end wall portions, said means resiliently retaining said valve mechanism comprising a compression spring constrained between the inner end of said plunger portion and the bottom wall of said blind cylindrical opening, said compression spring being operative, normally, to resiliently urge said plunger portion in the outward direction so that said outer wall portion of said plunger opening serves to squeezingly collapse a portion of said length of tubing passing therethrough against opposite side wall portions of said passageway.

2. A dispensing valve as defined in claim 1, wherein said means for securing said body member to the neck of a beverage bottle comprises means for sealing an outer peripheral wall portion of said length of flexible tubing with respect to the open mouth of a bottle to which said valve body member is secured, said sealing means comprising a resilient washer seated against said valve body member circumjacent said passageway entrance opening, said resilient washer having a central opening through which said length of flexible tubing extends, said central opening being defined by a peripheral wall of convex longitudinal cross-sectional shape, said securing means being operative to axially compress said resilient washer circumjacently against the peripheral lip of the mouth of a bottle to which said body member is secured, said axial compression of said resilient washer being operative to radially distort the peripheral wall of said washer central opening so as to squeezingly seal against a peripheral zone of said flexible tubing.

3. A dispensing valve as defined in claim 1, wherein said outer wall portion of said plunger opening is of convex hemispherical shape.

4. A dispensing valve as defined in claim 1, wherein said passageway in its passage through said body member follows an arcuate course of generally acute angular configuration.

5. A dispensing valve as defined in claim 4, wherein said body member in the shape of a fanciful characterization of an animal having a simulated neck portion and a simulated nose portion, said entrance opening being centrally disposed with respect to said neck portion and said discharge opening being centrally disposed with respect to said nose portion.

6. A dispensing valve as defined in claim 5 wherein said body member is of symmetrical shape about a vertical plane and is comprised of two half-shell body members secured together at their plane of symmetry.

7. A dispensing valve as defined in claim 6 wherein said half-shell members are integrally molded of a tough synthetic plastic material.

8. A dispensing valve as defined in claim 7, wherein said valve plunger mechanism is provided at its outer end with a manual control button in the form of a hat.

* * * * *